United States Patent
Aloe et al.

[11] Patent Number: 5,897,139
[45] Date of Patent: Apr. 27, 1999

[54] FRONT SUSPENSION CASTING

[75] Inventors: Alan S. Aloe, Waterford; James J. Johnson, Metamora, both of Mich.; Richard A. Sokol, Harrison City, Pa.; Matthew P. Kiley; Andrew B. Trageser, both of Pittsburg, Pa.; Keith Redden, Pointe Aux Pins; Gerald Budnick, Sterling Heights, both of Mich.

[73] Assignees: Chrysler Corporation, Auburn Hills, Mich.; Aluminum Company of America, Alcoa Center, Pa.

[21] Appl. No.: 09/019,247

[22] Filed: Feb. 5, 1998

[51] Int. Cl.$^6$ ........................................ B62D 21/00
[52] U.S. Cl. .................... 280/781; 280/788; 280/797; 296/204
[58] Field of Search ..................... 280/781, 785, 280/788, 796, 797, 798; 296/204, 205

[56] References Cited

U.S. PATENT DOCUMENTS

| | | | |
|---|---|---|---|
| 3,409,098 | 11/1968 | Brueder | 180/54.1 |
| 4,660,345 | 4/1987 | Browning | 52/648 |
| 5,456,517 | 10/1995 | Kalian et al. | 296/194 |
| 5,458,393 | 10/1995 | Benedyk | 296/203 |
| 5,797,647 | 8/1998 | Mehrkens et al. | 296/204 |

*Primary Examiner*—J. J. Swann
*Assistant Examiner*—David Dunn
*Attorney, Agent, or Firm*—William J. Coughlin

[57] ABSTRACT

A multi-piece front casting assembly for operably coupling components of a front suspension to a frame rail of a vehicle frame assembly. The casting assembly including an upper casting welded to the frame rail and having a pair of attachment locations extending laterally outwardly for operably coupling an upper control arm thereto, a attachment location extending laterally inwardly for operably coupling a rocker arm for a shock/spring assembly thereto, a suspension cross member attachment location, an engine cooling module attachment, a bumper mounting attachment, and two body structure attachment locations for securing the body structure to the frame assembly. The casting assembly further includes a front lower casting and a rear lower casting, each welded to the frame rail and having an attachment location for operably coupling a lower control arm thereto.

20 Claims, 5 Drawing Sheets

FRONT SUSPENSION CASTING

TECHNICAL FIELD

This invention relates generally to a frame assembly for a motor vehicle and more particularly to an aluminum casting for providing a plurality of attachment locations for the front suspension and body structure components.

BACKGROUND OF THE INVENTION

Historically, the body structures of automotive vehicles have fallen into one of two categories—body over frame vehicles and unibody vehicles. In both instances, steel has been used as the preferred material for the structural components of these vehicles due to its cost, strength, stiffness and formability. More recently, automobile manufacturers have explored the use of alternate materials, where suitable, in the manufacture of an automotive vehicle. For example, structural or reinforced molding compounds have been utilized in various exterior body panels, hoods, trunk lids, bumpers, etc. Similarly, other metal compositions such as aluminum or magnesium have been utilized. The use of these alternate materials for body structures has primarily been in nonstructural applications. More specifically, the frame and major body panels which provide strength and stiffness to the vehicle have continued to be fabricated from steel.

DISCLOSURE OF THE INVENTION

A general object of the present invention is to provide a vehicle frame design which is specifically adapted to be manufactured from high strength aluminum alloy to take full advantage of the beneficial material properties thereof.

Another object of the present invention is to provide a front suspension casting assembly having a simplified design which meets or exceeds all critical design specifications.

A further object of the present invention is to provide a front suspension casting for providing a pair of attachment locations for an upper control arm, an attachment for a rocker arm of a shock spring assembly, an attachment for an engine cooling module, and attachment locations for a bumper and a body structure.

Still another object of the present invention is to provide a pair of lower castings, each having an attachment location for a lower control arm. These and other objects and advantages will become more apparent when reference is made to the following drawings and accompanying description.

BEST MODE OF CARRYING OUT THE INVENTION

Figure 1:
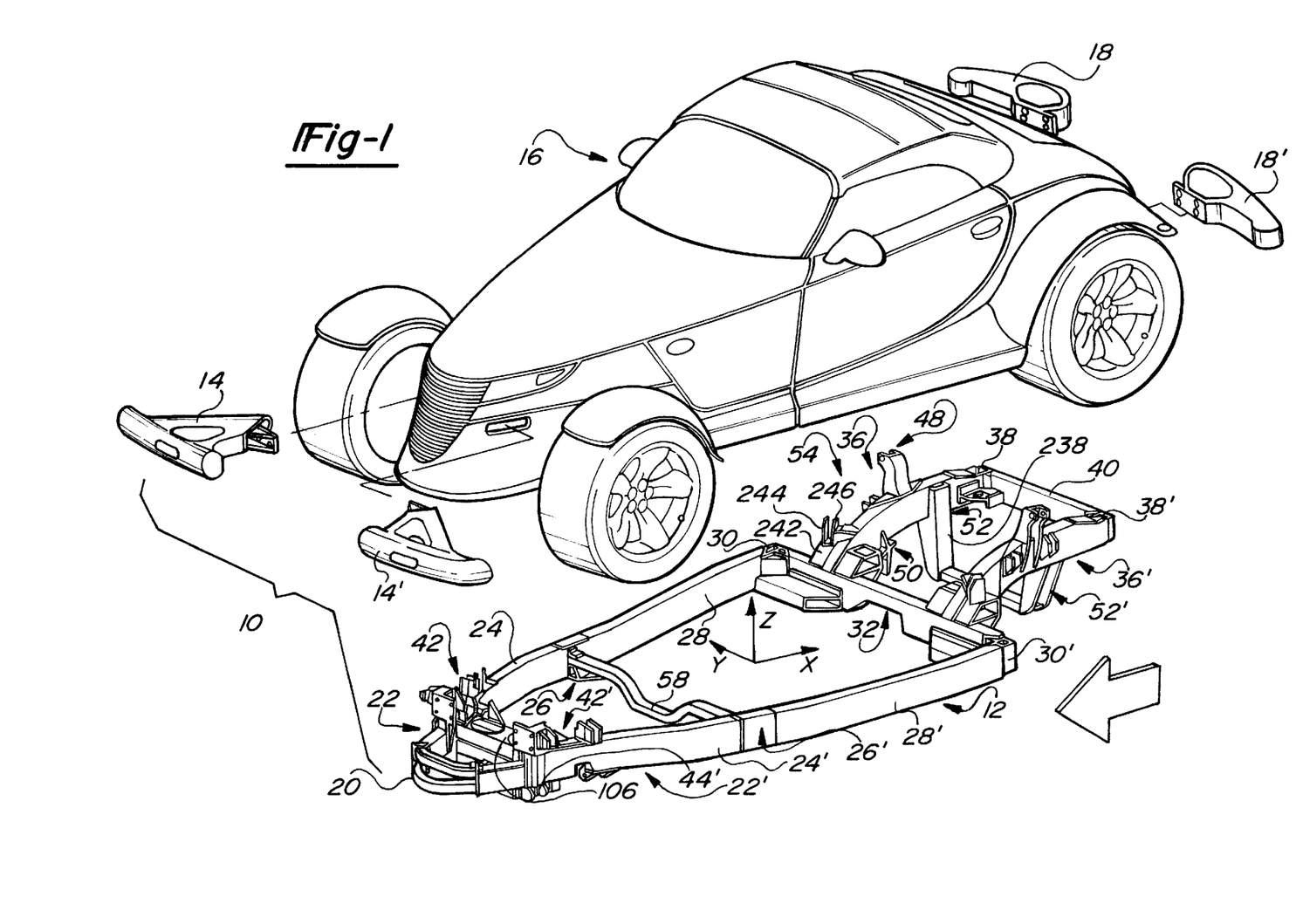
FIG. 1 is an exploded perspective view of an automotive vehicle of the type having a body over frame construction which incorporates the body mount support bracket of the present invention.

Referring now to the drawings in greater detail, FIG. 1 illustrates an automotive vehicle of the type having a body over frame construction. As used herein, the term left side refers to the driver's side of the vehicle and right side refers to the passenger's side of the vehicle. In the drawing, components generally located on the left side of the vehicle are indicated in prime reference numerals which correspond to components located on the right side of the vehicle. Throughout the specification, reference will be made to various axes of vehicle 10 according to the following coordinate system convention—the longitudinal axis, indicated as the X-axis in FIG. 1, which extends from the front to the rear of vehicle 10; the lateral axis, indicated as the Y-axis in FIG. 1, which extends from the center line to the right side of vehicle 10; and the vertical axis, indicated as the Z-axis in FIG. 1, which extends from the bottom to the top of vehicle 10. In addition, the arrow depicted in the perspective illustrations point toward the front of the vehicle. Automotive vehicle 10 includes a frame assembly 12 contributing the main load carrying structure of vehicle 10, as well as providing appropriate locations for attaching various automotive components thereto, such as the suspension and steering systems, the drive line system, the fuel system and the exhaust system. In addition, frame assembly 12 provides a plurality of locations for attaching body structure 16 and bumper assemblies 14, 14', 18, 18' to frame assembly 12.

In the presently preferred embodiment, frame assembly 12 is assembled from components fabricated out of high strength aluminum alloy. Thus, frame assembly 12 includes components which are uniquely adapted for fabrication out of high strength aluminum alloy. Frame assembly 12 includes a front crush zone assembly 20 extending rearwardly to front frame rail 24. Front suspension frame assembly 22 is secured to front frame rail 24 and provides a location for attaching components of a front suspension and engine cooling module (not shown) of vehicle 10 to frame assembly 12. Front frame rail 24 extends rearwardly to body mount support bracket assembly 26 which provides a transition between front frame rail 24 and rocker 28. Rocker 28 extends rearwardly and terminates at extruded node 30 which structurally couples to rear torque box assembly 32. Rear frame rail 34 extends rearwardly from rear torque box assembly 32 at a location inboard of extruded node 30. Rear suspension frame assembly 36 is secured to rear frame rail 34 and provides a location for attaching the components of a rear suspension (not shown) of vehicle 10 to frame assembly 12. Rear frame rail 34 extends rearwardly and terminates at extruded node 38 which structurally couples with rear cross member 40.

As presently preferred, a majority of the components utilized in frame assembly 12 are fabricated using an aluminum extrusion process which requires the structural member to have a substantially constant cross section. For example, front crush zone structure 20, front frame rail 24, body mount support bracket assembly 26, rocker 28, extruded node 30, rear torque box assembly 32, rear frame rail 34, extruded node 38, rear cross member 40 and extruded member 52 are fabricated using an aluminum extrusion process. Additional components which provide an interface to other vehicle components are fabricated as aluminum castings using a permanent mold casting process to provide the appropriate geometry and structural support to frame assembly 12. These components include upper casting 42, front lower casting 44 and rear lower casting 46 of front suspension frame assembly 22 and rear shock tower casting 48, lower extrusion 50 and front upper extrusion 54 of rear suspension frame assembly 36.

Figure 2:
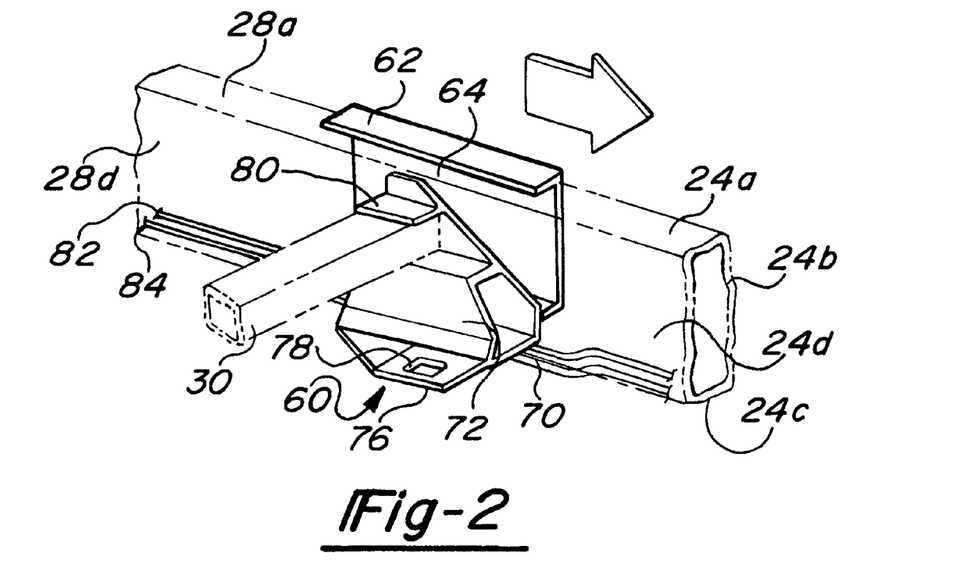
FIG. 2 is a detailed perspective view of the extruded body mount support bracket utilized in the frame assembly illustrated in FIG. 1.
Figure 3:
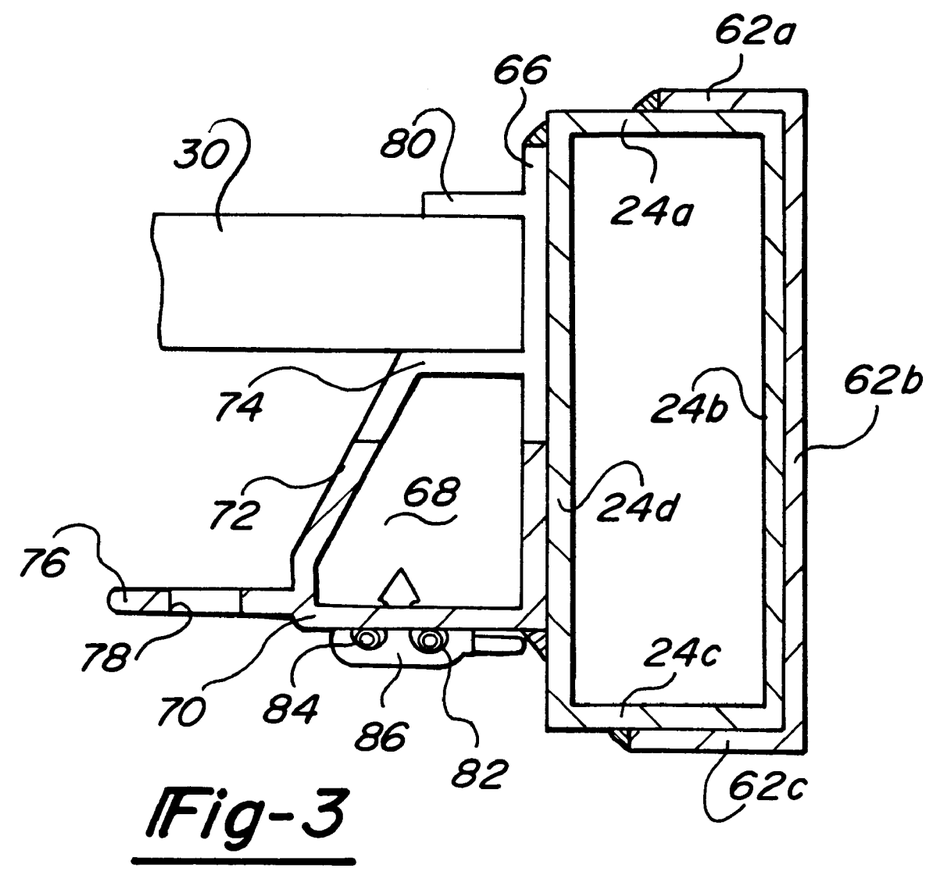
FIG. 3 is a cross sectional view of the body mount support bracket illustrated in FIG. 2.

With reference now to FIGS. 2 and 3, body mount support bracket assembly 26 includes inner body mount support bracket 60 and outer body mount support bracket 62 disposed on opposite sides of a longitudinal rail assembly including front frame rail 24 and rocker 28. More specifically, front frame rail 24 and rocker 28 have a substantially constant cross section and are fabricated from a high strength aluminum alloy such as 6061-T6 or 6063-T6 using an extrusion process and are axially aligned in an end-to-end manner. Inner body mount support bracket 60 includes outer wall 66 which abuts with inner walls 24d, 28d formed on front frame rail 24 and rocker 28, thereby forming a lap joint along the inner surface of interface 64. Outer body mount support bracket 62 is generally C-shaped having top flange 62a, side flange 62b, and bottom flange 62c capturing and secured to the top wall 24a, 28a, outer wall 24b, 28b and bottom wall 24c, 28c of front frame rail 24 and rocker 28, respectively, to form a lap joint therebetween to significantly increase the strength and stiffness of frame assembly 12 at interface 64.

As presently preferred, inner body mount support bracket 60 and outer body mount support bracket 62 have a substantially constant cross section and are fabricated from a high strength aluminum alloy such as 6061-T6 or 6063-T6 using an extrusion process. As presently preferred, inner body mount support bracket 60 and outer body mount support bracket 62 are welded to front frame rail 24 and rocker 28 by a suitable process, such as MIG welding, along the periphery thereof. Accordingly, the wall thickness of outer wall 66, top wall 62a, side wall 62b and bottom wall 62c are approximately equal to the wall thickness of front frame rail 24 and rocker 28. Suitable adhesives may also be utilized at the interface of these components to further enhance the attachment therebetween.

Inner body mount support bracket 60 includes outer wall 66 and inner wall 72 which are laterally spaced apart and extend generally vertically and lower wall 70 and upper wall 74 which are vertically spaced apart and which extend laterally inwardly to define a generally horizontal surface. Outer wall 66, lower wall 70, inner wall 72 and upper wall 74 are interconnected to define closed cell 68. Closed cell 68 of inner body mount support bracket 60 provides additional stiffness to the joint formed between front frame rail 24 and rocker 28 at interface 64. Body mount flange 76 extends laterally inwardly to define a generally horizontal surface having aperture 78 formed therein to receive a body mount for operably coupling frame assembly 12 and body structure 16. Flange 80 extends laterally inwardly from outer wall portion 66 above closed cell 68 to define a generally horizontal surface and cooperates with vertical wall portion 66 and upper wall 74 to provide a location for attaching engine cross member 58. As presently preferred, engine cross member 58 is positioned directly adjacent interface 64 between front frame rail 24 and rocker 28 thereby providing additional stiffness at this joint.

Inner wall 72 is formed at an inclined angle such that closed cell 68 tapers vertically upwardly to provide suffi-cient clearance for body structure 16. Similarly, the rearward edge of inner body mount support bracket 60 is contoured to provide the necessary clearance for body structure 16.

Inner body mount support bracket 60 also provides a location for attaching various vehicle components thereto. For example, as best seen in FIG. 3, fuel lines 84, 82 are positioned and extend along rocker 28 and front frame rail 24 attached to lower wall portion 70 with suitable attachment clip 86. More specifically, attachment clip 86 is attached to 70 by way of a self tapping screw and captures and appropriately positions fuel lines 82, 84.

Figure 4:
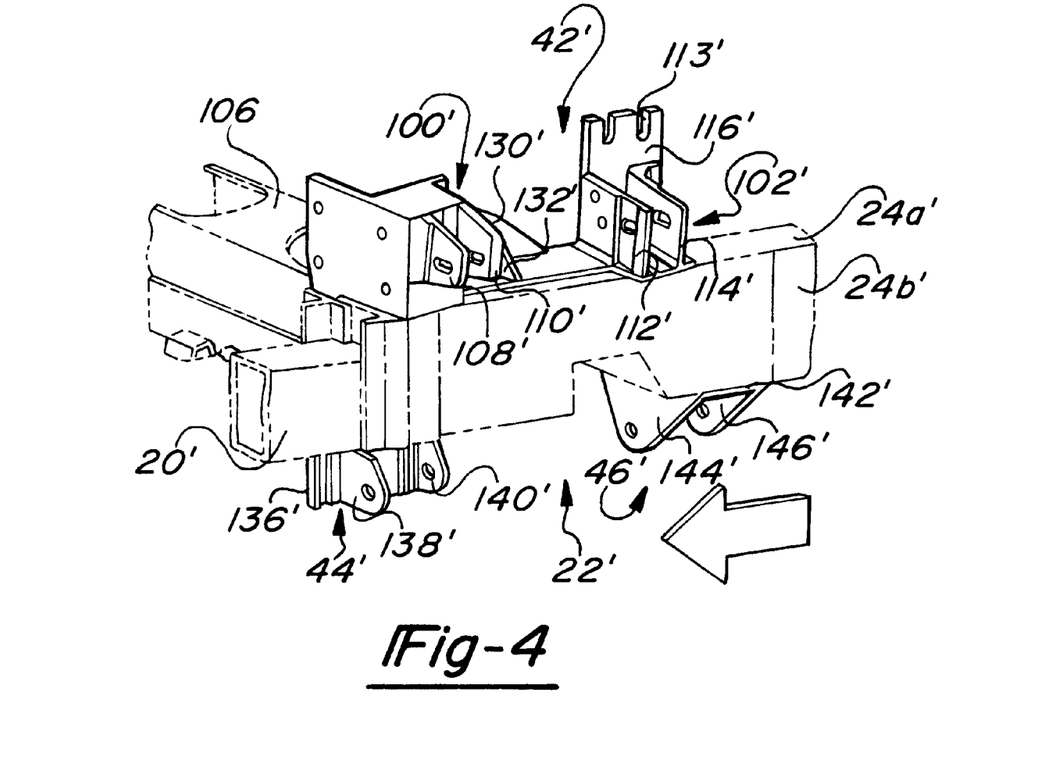
FIG. 4 is a detailed perspective view of the front suspension casting utilized in the frame assembly illustrated in FIG. 1.
Figure 5:
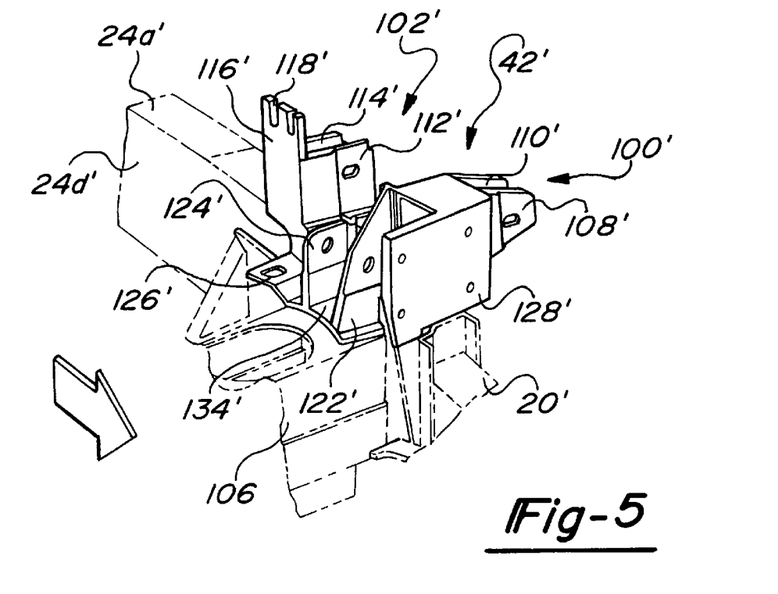
FIG. 5 is a detailed perspective view of the front suspension casting taken from a side opposite that shown in FIG. 3.

With reference now to FIGS. 4 and 5, a front frame assembly 22 operably couples the components of a front suspension, such as upper and lower control arms, and rocker links for a shock/spring assembly, as well as attaching the body structure 16 and bumper 14, 14' and attaching the cooling module to frame assembly 12. The front frame assembly 22 includes upper casting 42' and front and rear lower castings 44' and 46' secured to a forward portion of frame rail 24' of frame assembly 12. More specifically, upper casting 42' is welded to the upper surface 24a' and inboard surface 24d' of front frame rail 24' and provides multiple interfaces for other vehicle components. Likewise, front and rear lower castings 44', 46' are welded to a lower surface 24c' of frame rail 24' and provides an interface for attaching a lower control arm assembly (not shown) to frame assembly 22. As presently preferred, upper casting 42' and front and rear lower castings 44', 46' are fabricated from a high strength aluminum alloy such as A356-T6 using a permanent mold casting process.

As viewed from the outboard side in FIG. 4, upper control arm attachment portion 100' of upper casting 42' includes a pair of flanges 108', 110' which are longitudinally spaced apart and extend laterally outwardly to define a vertical surface. Similarly, front control arm attachment location 102' includes a pair of lateral flanges 112', 114' which are spaced apart by vertical side wall 116' and extend outwardly therefrom. Flanges 108', 110' and flanges 112', 114' have apertures formed therethrough for receiving bolts to operably couple an upper control arm of the front suspension to casting 42'. Side wall 116' extends longitudinally to define a vertical surface and has a pair of slotted apertures 118' formed therein to provide an attachment location for vehicle body structure 16. Flange 120' extends longitudinally between front suspension attachment location 100' and front suspension attachment location 102' to define a substantially horizontal surface for positioning and securing upper casting 42' to top surface 24a' of front frame rail 24'. Similarly, a portion of vertical side wall 116' extends downwardly beyond flange 120' and provides a substantially vertical surface for position and securing upper casting 42' to inner surface 24d' of front frame rail 24'.

A pair of flanges 122', 124' are longitudinally spaced apart and extend laterally inwardly to define a vertical surface from a rear portion of upper casting 42'. Flanges 122', 124' have an aperture formed therein to receive a bolt to operably couple a rocker arm for a spring/shock assembly of the front suspension to casting 42'. Flange 126' extends laterally inwardly from vertical wall portion 116 to define a horizontal surface. Flange 126' has an aperture formed therethrough to receive an engine cooling module mount for operably coupling body structure 16 to frame assembly 12. Flange 128' extends vertically upwardly from flange 120' to define a vertical surface at a forward portion of upper casting 42' and provides a location for attaching the front bumper assembly 14, 14' as shown in FIG. 1 to casting 42'. Upper casting 42' further includes vertical gusset 130' extending rearwardly from attachment location 100' and vertical gusset 132' extending laterally from attachment location 100'. Contoured flange 134' extends laterally inwardly from vertical face 116' to define a generally horizontal surface which abuts an upper portion of suspension cross member 106. As presently preferred, upper casting 42' is welded to front frame rail 24' and front suspension cross member 106 by a suitable process, such as MIG welding, along the periphery thereof. Suitable adhesives may also be utilized at the interface of these components to further enhance the attachment therebetween.

Front lower casting 44' includes a wall portion 136' which extends vertically downwardly from inner surface 24d' of front frame rail 24'. A pair of flanges 138', 140' extend laterally outwardly from vertical wall portion 136' to define vertical surfaces. Similarly, rear lower casting 46' includes a horizontal wall portion 142' secured to lower surface 24c' of front frame rail 24' and a pair of flanges 144', 146' extending vertically downwardly from horizontal wall 142'. Flanges 138', 140' of front lower casting 44' and flanges 144', 146' of rear lower casting 46' have apertures formed therethrough for receiving a fastener to operably couple a lower control arm of the front suspension to frame assembly 12. Front and rear lower castings 44', 46' are preferably welded to frame assembly 12 by a suitable process, such as MIG welding around an outer periphery of castings 44', 46' to the adjacent frame component. Suitable adhesives may also be utilized at the interface of these components to further enhance the attachment therebetween.

Figure 6:
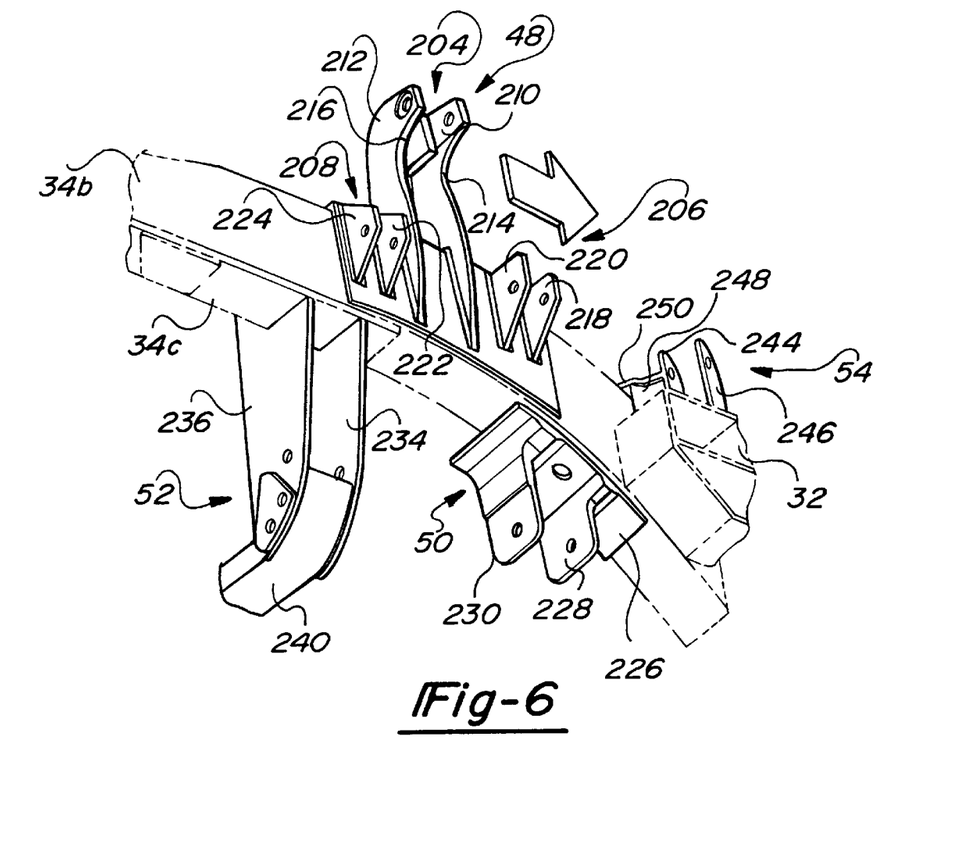
FIG. 6 is a detailed perspective view of the rear shock tower casting utilized in the frame assembly illustrated in FIG. 1.

Referring now to FIGS. 1 and 6, the locations for attaching a rear suspension to rear frame rail 34 of frame assembly 12 are provided by rear suspension frame assembly 36 which includes rear shock tower casting 48, lower extrusion 50 and front upper extrusion 54 and extruded member 52. As presently preferred, castings 48 is fabricated from high strength aluminum alloy such as A356-T6 using a permanent mold casting process. Extruded member 52 is fabricated from a high strength aluminum alloy such as 6061-T6 or 6063-T6 using an extrusion process. Castings 48, as well as extruded members 50, 54, 52 are welded to rear frame rail 34 by a suitable process, such as MIG welding, along the periphery thereof.

Rear shock tower casting 48 includes wall portion 200 extending longitudinally to define a horizontal surface disposed on a top surface (not specifically shown) of rear frame rail 34 and wall portion 202 extending longitudinally to define a vertical surface disposed along wall 34b of rear frame rail 34. Rear shock tower casting 48 is welded to rear frame rail 34 along the periphery of horizontal wall 200 and vertical wall 202. Rear shock tower casting 48 further includes rear shock tower attachment location 204 generally centrally disposed thereon, and a pair of lateral link attachment locations 206, 208 disposed on opposite sides of rear shock attachment location 204.

Rear shock attachment location 204 is defined by a pair of vertical wall portions 210, 212 extending upwardly from horizontal wall portion 200. Vertical wall portions 210, 212 are situated in a longitudinally, spaced apart relationship by vertical wall portion 211 extending therebetween as best seen in FIG. 1. Arcuate recesses 214, 216 are formed in the outboard edges of vertical wall portions 210, 212 to provide adequate clearance for the upper portion of a rear shock/spring assembly. An aperture is formed through vertical wall portions 210, 212 to receive a fastener for operably coupling a spring/shock assembly to casting 48. Front lateral link attachment location 206 includes a pair of flanges 218, 220 extending laterally outwardly from vertical wall portion 202. An aperture is formed therethrough for receiving a fastener to operably couple a front lateral link of the rear suspension to rear shock tower casting 48. Similarly, rear lateral link attachment location includes a pair of flanges 222, 224 extending laterally outwardly from vertical wall portion 202. An aperture is formed through lateral flanges 222, 224 for receiving a threaded fastener to operably couple a rear lateral link of the rear suspension to frame assembly 12.

Lower extrusion 50 includes attachment flange 226 extending generally longitudinally along the contour of lower surface 34c of rear frame rail 34. A pair of flanges 228, 230 extend vertically downwardly from attachment flange 226. An aperture is formed therethrough for receiving a fastener to operably couple a portion of the rear suspension control arm to frame assembly 12. As best seen in FIG. 1, gusset 232 extends vertically upwardly from attachment flange 226 to provide additional local stiffness to lower extrusion 50.

Extruded member 52 is secured at an upper end to bottom surface 34c and inner surface 34d of rear frame rail 34 and extends vertically downwardly to provide an attachment location for a rear portion of the lower control arm of the rear suspension. More specifically, extruded member 52 includes a pair of vertical side walls 234, 236 longitudinally spaced apart by and extending laterally outwardly from web portion 238. Vertical web portion 238, as best seen in FIG. 1, interconnects vertical portions 234, 236 in a spaced apart relationship to provide additional stiffness thereto. An upper end of extruded member 52 is relieved to conform to bottom surface 34c and inner surface 34d of rear frame rail 34. An aperture formed through vertical wall portions 234, 236 receive a fastener for operably coupling a rear portion of the rear suspension lower control arm to frame assembly 12. Rear suspension cross member 240 is secured to a bottom end of extruded member 52 and extends laterally to extruded member 52' for further stiffening for the lower control arm attachment location.

Front upper extrusion 54 provides an attachment location to operably coupled a guide link of the rear suspension to frame assembly 12. More specifically, front upper extrusion 54 includes attachment flange A extending laterally inwardly to define a horizontal surface which is welded to a portion of rear torque box assembly 32. A pair of flanges 244, 246 extend vertically upwardly from attachment flange A and have an aperture formed therethrough for receiving a fastener to operably couple the guide link to frame assembly 12. A vertical support flange 248 and horizontal support flange 250 extend generally laterally from vertical flange 244 and engage an upper portion of rear frame rail 34 to provide additional stiffness to front upper extrusion 54.

As previously described, frame assembly 12 includes extruded nodes 30, 30', 38 and 38' which interconnect a longitudinal frame member with a lateral frame member. As presently preferred, these extruded nodes are fabricated from a high strength aluminum alloy such as 6061-T6 or 6063-T6 by an extrusion process. Nodes 30, 30' are substantially similar to nodes 38 and 38' and provide adequate stiffness at the joints to maintain the structural integrity of frame assembly 12, thereby achieving the desired torsional and bending stiffness characteristics. Due to the similarity of these nodes, only a detailed description of extruded node 38 is provided herein.

Figure 7:
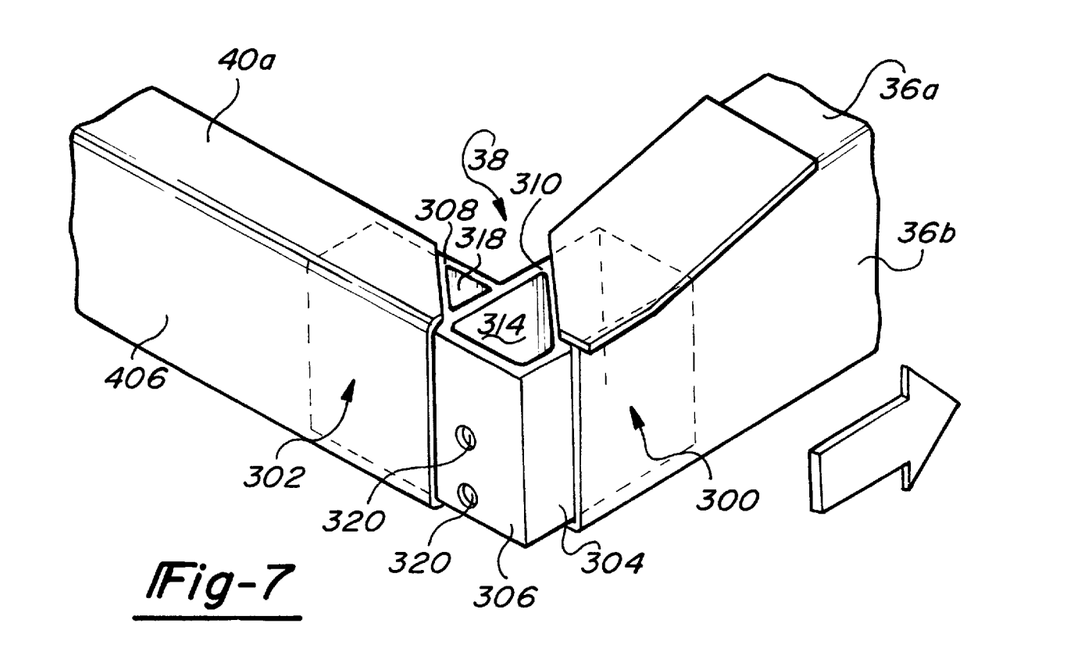
FIG. 7 is a detailed perspective view of the extruded node utilized in the frame assembly illustrated in FIG. 1.
Figure 8:
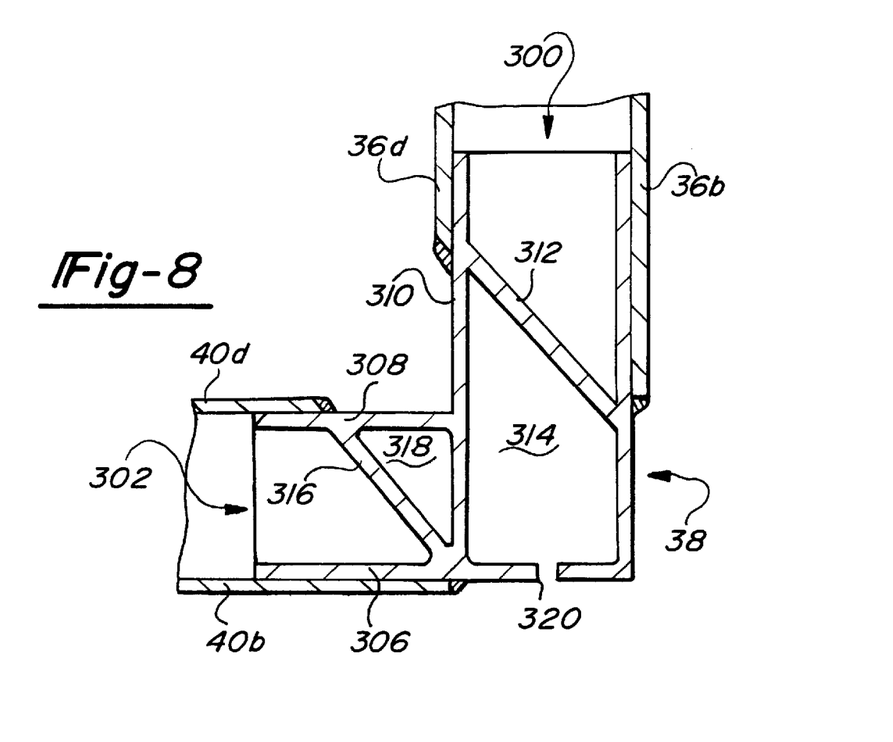
FIG. 8 is a cross sectional view of the extruded node illustrated in FIG. 7.

With reference now to FIGS. 7 and 8, extruded node 38 rigidly secures rear frame rail 34 with rear cross member 40. Extruded node 38 is a generally L-shaped node having a longitudinal portion 300 received within an interior volume defined by upper wall 34a, outer wall 34b, lower wall 34c and inner wall 34d of rear frame rail 34 and a lateral portion 302 received within an interior volume defined by upper wall 40a, outer wall 40b, lower wall 40c and inner wall 40d of rear cross member 40. More specifically, extruded node 38 is defined by outer longitudinal side wall 304, outer transverse side wall 306, inner transverse side wall 308 and inner longitudinal side wall 310. Interior wall portion 312 extends between outer longitudinal side wall 304 and inner longitudinal side wall 310 to define closed cell 314, thereby triangulating the geometry of extruded node 308 to substantially increase the stiffness thereof. Similarly, interior wall portion 316 extends between outer transverse side wall 306 and inner transverse side wall 308 to define closed cell 318. Apertures 320 are formed through outer transverse side wall 306 for receiving bolts to operably couple rear bumper assembly 18, 18' to frame assembly 12. As presently preferred, extruded node 38 is welded to rear frame rail 34 and rear cross member 40 by a suitable process, such as MIG welding, around the periphery thereof. Additionally, a structural adhesive may be utilized at the interface therebetween to provide additional structural attachment.

With reference to FIG. 1, as presently preferred, frame assembly 12 is assembled with the cast components heretofore described in a rough or unmachined state such that the location surfaces defined thereon require further processing prior to assembly of the vehicle. In this regard, once frame assembly 12 has been assembled, the entire frame assembly is accurately positioned within a computer controlled machining apparatus which includes geometric reference data to precisely determine the attachment locations for the various components heretofore described.

After frame assembly 12 is appropriately positioned, the computer controlled machining equipment processes frame assembly 12 by milling or otherwise machining each attachment location to achieve the desired geometric dimensional tolerance for frame assembly 12. For example, the attachment locations 100, 102 for the upper and lower control arms of the front suspension assembly, as well as the rocker arm attachment location are machined relative to one another such that the geometric dimensional tolerancing for the front suspension system is within the set specifications for each frame assembly irrespective of dimensional differences due to build tolerances of frame assembly 12. Similarly, body mount attachment location 118, 118' and bumper attachment location 128, 128' can be precisely machined to ensure satisfactory fit between frame assembly 12 and body structure 16 and front bumper assembly 14, 14', respectively. Likewise, the attachment locations for the rear suspension components can be precisely machined with respect to one another to ensure correct positioning of these components.

While the present invention has been described in reference to a particular preferred embodiment, one skilled in the art would readily recognize that certain modifications could be made thereto without deviating from the scope of the present invention.

What is claimed:

1. An automotive frame assembly having a casting for attaching a vehicle component to a frame rail, the frame assembly comprising:

a frame rail having a top surface, a bottom surface, an outer surface and an inner surface; and a casting having a horizontal flange secured to said top surface of said frame rail, a vertical wall secured to said inner surface of said frame rail, a first attachment location formed on a forward end of said horizontal flange and a second attachment location formed on a rearward end of said flange, each of said first and second attachment locations having a pair of flanges which are longitudinally spaced apart and extend laterally outwardly from said horizontal flange, said first and second attachment locations providing a location to operably couple a vehicle component to said frame rail.

2. The frame assembly of claim 1 wherein each of said pair of lateral flanges of said first and second attachment locations have an aperture formed therethrough for receiving a fastener to operably couple a vehicle component thereto.

3. The frame assembly of claim 1 further comprising a third attachment location intermediately disposed between said first and second attachment locations, said third attachment location having a pair of flanges which are longitudinally spaced apart and extend laterally inwardly from said vertical wall, said third attachment location providing a location to operably couple a vehicle component to said frame rail.

4. The frame assembly of claim 1 further comprising a contoured flange extending laterally inwardly from said vertical wall, said contoured flange defining a fourth attachment location for securing a cross member extending inwardly from said frame rail thereto.

5. The frame assembly of claim 4 wherein said contoured flange has a horizontal flange extending therefrom defining a fifth attachment location to receive a body mount for securing a body structure thereto.

6. The frame assembly of claim 1 further comprising a wall extending vertically upwardly from said horizontal flange to define sixth attachment location to secure a body structure thereto.

7. The frame assembly of claim 1 further comprising a wall extending vertically upwardly from said horizontal flange at said forward end thereof to define seventh attachment location for securing a bumper thereto.

8. The frame assembly of claim 1 wherein said casting is welded around a periphery thereof to said frame rail.

9. The frame assembly of claim 1 wherein said frame rail and said casting are fabricated using a high strength aluminum alloy.

10. The frame assembly of claim 1 wherein said casting is fabricated using a permanent mold casting process.

11. In an automotive frame assembly of the type having a frame rail including a top surface, a bottom surface, an outer surface and an inner surface, the improvement comprising an aluminum casting having:

a first horizontal flange secured to said top surface of said front frame rail, a vertical wall secured to said inner surface of said front frame rail;

a first attachment location formed on a forward end of said flange and a second attachment location formed on a rearward end of said flange, each of said first and second attachment locations having a pair of flanges which are spaced longitudinally apart and extend laterally outwardly from said first horizontal flange;

a third attachment location intermediately disposed between said first and second attachment locations, said third attachment location having a pair of flanges which are spaced longitudinally apart and extend laterally inwardly from said vertical wall;

a contoured flange extending inwardly from said vertical wall beneath said third attachment location, said contoured flange defining a fourth attachment location for securing a cross member to said casting;

a second horizontal flange extending from said contoured flange to define fifth attachment location for receiving a body mount to operably couple a body structure to said casting;

a second vertical wall extending upwardly from said first horizontal flange to define sixth attachment location for securing a body structure to said casting; and a third vertical wall extending upwardly from said forward end of said first horizontal flange to define seventh attachment location for securing a bumper thereto.

12. An automotive frame assembly having a casting assembly for attaching a vehicle component to a frame rail, the frame comprising:

a frame rail having a top surface, a bottom surface, an outer surface and an inner surface;

an upper casting assembly having a horizontal flange secured to said top surface of said frame rail, a first vertical wall secured to said inner surface of said frame rail, a first attachment location formed on a forward end of said horizontal flange and a second attachment location formed on a rearward end of said flange, each of said first and second attachment locations having a pair of flanges which are spaced longitudinally apart and extend laterally outwardly from said first vertical wall;

a front lower casting having a second vertical wall secured to said inner surface of said frame rail, and a pair of flanges which are spaced longitudinally apart and extend laterally outwardly from said second vertical wall to define a third attachment location; and a rear lower casting having a horizontal wall secured to said lower surface of said frame rail, and a pair of flanges which are spaced longitudinally apart and extend vertically downwardly from said horizontal wall to define a fourth attachment location;

said first, second, third and fourth attachment locations providing a location to operably couple said vehicle component to said frame rail.

13. The frame assembly of claim 12 wherein each of said pair of flanges of said first, second, third and fourth attachment locations have an aperture formed therethrough for receiving fasteners to operably coupling said vehicle component thereto.

14. The frame assembly of claim 12 further comprising said upper casting having a fifth attachment location intermediately disposed between said first and second attachment locations, said fifth attachment location having a pair of flanges which are spaced longitudinally apart and extend laterally inwardly from said vertical wall, said fifth attachment location providing a location to operably couple a vehicle component to said frame rail.

15. The frame assembly of claim 12 further comprising a contoured flange extending laterally inwardly from said vertical wall, said contoured flange defining a sixth attachment location for securing a cross member extending inwardly from said frame rail thereto.

16. The frame assembly of claim 15 wherein said contoured flange has a horizontal flange extending therefrom to define a seventh attachment location for receiving a body mount to secure an engine cooling module.

17. The frame assembly of claim 12 further comprising a wall extending vertically upwardly from said horizontal flange to define eighth attachment location to secure a body structure thereto.

18. The frame assembly of claim 12 further comprising a wall extending vertically upwardly from said horizontal flange at said forward end thereof to define an ninth attachment location for securing a bumper thereto.

19. The frame assembly of claim 12 wherein said frame rail, said upper casting, said front lower casting and said rear lower casting are fabricated using a high strength aluminum alloy.

20. The frame assembly of claim 12 wherein said upper casting, said front lower casting and said rear lower casting are fabricated using a permanent mold casting process.

* * * * *